(12) United States Patent
Schadow et al.

(10) Patent No.: US 11,993,214 B2
(45) Date of Patent: May 28, 2024

(54) DATA AND/OR COMMAND DEVICE

(71) Applicant: Robert Bosch GmbH, Stuttgart (DE)

(72) Inventors: Joachim Schadow, Stuttgart (DE); Florian Esenwein, Leinfelden-Echterdingen (DE); Joern Stock, Tuntenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 17/258,332

(22) PCT Filed: May 24, 2019

(86) PCT No.: PCT/EP2019/063503
§ 371 (c)(1),
(2) Date: Jan. 6, 2021

(87) PCT Pub. No.: WO2020/011441
PCT Pub. Date: Jan. 16, 2020

(65) Prior Publication Data
US 2021/0268971 A1   Sep. 2, 2021

(30) Foreign Application Priority Data
Jul. 11, 2018  (DE) ............... 10 2018 211 474.9

(51) Int. Cl.
*B60R 16/023* (2006.01)
*B60K 35/00* (2006.01)
(Continued)

(52) U.S. Cl.
CPC ............ *B60R 16/023* (2013.01); *B60K 35/00* (2013.01); *B60R 16/03* (2013.01); *B60K 35/28* (2024.01);
(Continued)

(58) Field of Classification Search
CPC ....... B60R 16/023; B60R 16/03; B60K 35/00; B60K 2370/177; B60K 2370/178
See application file for complete search history.

(56) References Cited

U.S. PATENT DOCUMENTS 8,970,377 B2 *  3/2015  Heine ................... G01V 15/00
340/568.1
9,367,062 B2   6/2016  Volpert
(Continued)

FOREIGN PATENT DOCUMENTS

| CN | 101436689 A | 5/2009 |
| CN | 107792080 A | 3/2018 |

(Continued)

OTHER PUBLICATIONS

International Search Report corresponding to PCT Application No. PCT/EP2019/063503, dated Jun. 28, 2019 (German and English language document) (5 pages).

*Primary Examiner* — Chico A Foxx
(74) *Attorney, Agent, or Firm* — Maginot, Moore & Beck LLP

(57) ABSTRACT

The disclosure relates to a data and/or command device, in particular for vehicles, having at least one communication unit for receiving at least item of non-charging-related object information from at least one electrical unit, in particular a hand-held power tool, and/or at least one item of vehicle information from at least one vehicle in which the electrical unit is situated. According to the disclosure, the data and/or command device comprises at least one open-loop and/or closed-loop control unit which is designed to output at least one signal and/or to control the electrical unit in an open-loop and/or closed-loop manner depending on an evaluation of the non-charging-related item of object information and/or the item of vehicle information.

14 Claims, 2 Drawing Sheets

(51) Int. Cl.
*B60R 16/03* (2006.01)
*B60K 35/28* (2024.01)

(52) U.S. Cl.
CPC .. *B60K 2360/177* (2024.01); *B60K 2360/178* (2024.01)

(56) References Cited

U.S. PATENT DOCUMENTS

| | | | |
|---|---|---|---|
| 9,553,471 | B2 | 1/2017 | Chinnadurai et al. |
| 9,659,274 | B2 * | 5/2017 | Waters ................ H04W 4/029 |
| 9,824,571 | B2 * | 11/2017 | Sedayao ............ G08B 21/0236 |
| 10,535,169 | B2 * | 1/2020 | Dotterweich ........ G06K 7/1413 |
| 11,559,713 | B2 * | 1/2023 | Cerrano ................ H02K 9/22 |
| 2010/0265061 | A1 | 10/2010 | Harmon et al. |
| 2014/0062699 | A1 * | 3/2014 | Heine ................ G06K 7/10009 340/572.1 |
| 2014/0062700 | A1 * | 3/2014 | Heine ................ G06Q 10/087 340/572.1 |
| 2015/0179036 | A1 * | 6/2015 | Heine ................ G06Q 10/08 340/572.1 |
| 2016/0055451 | A1 * | 2/2016 | Waters ................ G01S 19/01 340/8.1 |
| 2018/0122118 | A1 * | 5/2018 | Dotterweich ........ G06K 7/1417 |
| 2018/0145523 | A1 * | 5/2018 | Hunger ................ H02J 7/0045 |
| 2018/0146267 | A1 * | 5/2018 | Stampfl ................ H04W 48/18 |
| 2018/0157258 | A1 * | 6/2018 | O'Brien ............ G05D 1/0088 |
| 2021/0165700 | A1 * | 6/2021 | Breaux ................ H04W 4/80 |

FOREIGN PATENT DOCUMENTS

| | | |
|---|---|---|
| DE | 10 2012 206 728 A1 | 10/2013 |
| DE | 10 2016 225 730 A1 | 6/2018 |
| WO | 2017/197409 A1 | 11/2017 |

* cited by examiner

DATA AND/OR COMMAND DEVICE

This application is a 35 U.S.C. § 371 National Stage Application of PCT/EP2019/063503, filed on May 24, 2019, which claims the benefit of priority to Serial No. DE 10 2018 211 474.9, filed on Jul. 11, 2018 in Germany, the disclosures of which are incorporated herein by reference in their entirety.

BACKGROUND

A data and/or command device, in particular for vehicles, comprising at least one communication unit for receiving at least one item of non-charging-related object information of at least one electrical unit, in particular a hand-held power tool, and/or at least one item of vehicle information of at least one vehicle in which the electrical unit is arranged, has already been proposed.

SUMMARY

The present disclosure is directed to a data and/or command device, in particular for vehicles, comprising at least one communication unit for receiving at least one item of non-charging-related object information of at least one electrical unit, in particular a hand-held power tool, and/or at least one item of vehicle information of at least one vehicle in which the electrical unit is arranged.

It is proposed that the data and/or command device comprises at least one control and/or regulating unit which is configured to output at least one alert and/or to control and/or regulate the electrical unit, as a function of an evaluation of the item of non-charging-related object information and/or the item of vehicle information.

A "control and/or regulating unit" is to be understood in particular to mean a unit comprising a least one electronic control system. An "electronic control system" is to be understood to mean in particular a unit comprising a processor unit and comprising a memory unit, and comprising an operating program stored in the memory unit. The control and/or regulating unit can be configured in particular as a computer, for example, a stationary computer, a laptop, a server, or the like; as a microcontroller, an integrated circuit, or as another control and/or regulating unit which is considered by those skilled in the art to be reasonable. Preferably, the control and/or regulating unit is configured at least to some extent as a gateway or is integrated into a gateway. In particular, the data and/or command device can be configured as a gateway. Preferably, the data and/or command device, in particular the control and/or regulating unit, is associated with a bevy of electrical units. A bevy of electrical units is in particular a plurality of associated electrical units which is preferably associated with a work crew, a vehicle, a work project, or the like. Preferably, the control and/or regulating unit is configured to evaluate non-charging-related object information of a plurality of electrical units, and/or to control and/or regulate a plurality of electrical units. The term "configured" is to be understood to mean in particular specifically programmed, specifically designed, and/or specifically equipped. An object being configured to carry out a particular function is to be understood to mean that the object fulfills and/or carries out this particular function in at least one application state and/or operating state.

The data and/or command device, in particular the control and/or regulating unit, is preferably configured for arrangement in a spatial proximity to the electrical unit, for example, in a same vehicle, in a same storage unit, in a same workshop, or the like, as the electrical unit. Preferably, an arrangement of the data and/or command device in a spatial proximity to the electrical unit enables communication between the data and/or command device and the electrical unit via short-range communication links, for example, Bluetooth, WLAN, NFC, or the like. The data and/or command device, in particular the control and/or regulating unit, is preferably configured for use, in particular for arrangement, in a vehicle. In particular, the vehicle is configured for transport of the electrical unit. In particular, the data and/or command device, in particular the control and/or regulating unit, can also be configured for use, in particular arrangement, in a storage unit, in a workshop, at a construction site, or the like.

The communication unit is preferably configured for receiving and/or or transmitting electronic data. Preferably, the item of non-charging-related object information of the electrical unit and/or the item of vehicle information are/is provided to the communication unit in the form of electronic data. The communication unit is preferably configured as a wireless communication unit. In particular, the communication unit can be configured as a radio module, as a WLAN module, a Bluetooth module, as an NFC module, or as another wireless communication unit which is considered by those skilled in the art to be reasonable. Alternatively, it is conceivable that the communication unit is configured as a wired communication unit which in particular comprises a wired connection, for example, via an Ethernet cable or the like, for receiving and/or transmitting electronic data. The communication unit is preferably configured to provide the received electronic data, in particular the item of non-charging-related object information and/or the item of vehicle information, to the control and/or regulating unit, in particular via a wired data line or a wireless data line.

The electrical unit is in particular configured as a unit which can be operated by means of electrical energy. Preferably, the electrical unit is configured as a machine tool, in particular as a hand-held power tool, for example, as a drill, as a drill hammer and/or chipping hammer, as a battery-operated screwdriver, as a circular saw, as an angle grinder, as a gardening tool, or the like. Alternatively or in addition, it is conceivable that the electrical unit is configured as an electrical device which is different from a machine tool, for example, as a laptop, as a tablet, as a smartphone, as a digital camera, or the like. Preferably, the electrical unit comprises at least one communication unit which in particular has a configuration which is at least essentially analogous to that of the communication unit of the data and/or command device. Preferably, the communication unit of the electrical unit is configured to provide the item of non-charging-related object information to the data and/or command device, in particular to the control and/or regulating unit, via the communication unit of the data and/or command device. In particular, the control and/or regulating unit is configured to control and/or regulate a plurality of different electrical units, in particular at least essentially simultaneously.

The item of non-charging-related object information is in particular an item of information about the electrical unit, which the electrical unit provides itself. Preferably, the item of non-charging-related object information is independent of charging, in particular of a charging state and of a charging operation, of the electrical unit. The item of non-charging-related object information can be configured in particular as an operating temperature of the electrical unit, as a rotational speed of a drive unit of the electrical unit, as a kind of insertion tool attached to the electrical unit, as a force acting on the electrical unit, in particular operator force, as an acceleration parameter of the electrical unit, as a pressure parameter of the electrical unit, or as another item of non-charging-related object information which is considered by those skilled in the art to be reasonable. The item of vehicle information relates in particular to transport of the electrical unit and/or to a vehicle which is configured for transport of the electrical unit. The item of vehicle information can be configured in particular as a transport speed of the vehicle, as a position of a vehicle transporting the electrical unit, as a range of the vehicle, as a route profile of a route of the vehicle, as energy consumption, in particular fuel consumption, of the vehicle, or as another item of vehicle information which is considered by those skilled in the art to be reasonable. The control and/or regulating unit is preferably configured to evaluate the item of non-charging-related object information and/or the item of vehicle information. In particular, the control and/or regulating unit can comprise a circuit which is configured for an evaluation of the item of non-charging-related object information and/or the item of vehicle information, an evaluation program which is stored in a memory unit of the control and/or regulating unit, or the like. Preferably, the control and/or regulating unit is configured to evaluate a combination of a plurality of in particular different items of non-charging-related object information and/or vehicle information, in particular of a plurality of electrical units. Preferably, the control and/or regulating unit is configured to evaluate other information, for example, from a planning system, in particular a BIM (building infrastructure model), from external sensors, from a server, or the like.

The control and/or regulating unit is preferably configured to output a plurality of alerts and/or to control and/or regulate a plurality of electrical units, as a function of an evaluation of the item of non-charging-related object information and/or the item of vehicle information. The alert can be configured in particular as a motivational alert, as a charging alert, as an alarm alert, or the like. In particular, the alert is configured as an optical alert, as an acoustic alert, and/or as a haptic alert. Preferably, the control and/or regulating unit is configured to output the alert indirectly, for example, via an output unit of the data and/or command device, for example, a display screen, a loudspeaker, a vibration motor, or the like; or via an external device, for example, a smartphone, a tablet, virtual reality glasses, or the like. Control and/or regulation of the electrical unit can be configured in particular as a readiness check, as a charging operation, as an activation or deactivation, or the like.

By means of the embodiment of the data and/or command device according to the present disclosure, it is advantageously possible to enable monitoring and control and/or regulation of electrical units, in particular in a vehicle. Advantageously, it is possible to enable comfortable, user-friendly, and/or motivating management, control, and/or regulation of electrical units, particularly in a vehicle and/or together with a vehicle.

In addition, it is proposed that the control and/or regulating unit is configured to carry out a readiness check of the electrical unit, as a function of an evaluation of the item of non-charging-related object information and/or the item of vehicle information. An item of vehicle information which is to be evaluated with respect to the readiness check can be configured in particular as a remaining travel time to a location of use, for example, a construction site. Preferably, for conducting a readiness check, the control and/or regulating unit is configured to check a charging state of the electrical unit, a maintenance state of the electrical unit, insertion tools which are available for use with the electrical unit, a final safety check of the electrical unit, or the like. Preferably, the control and/or regulating unit is configured for a readiness check, as a function of an evaluation of task-related information, for example, about a type of electrical unit required for a task. Preferably, the control and/or regulating unit is configured to control and/or regulate the electrical unit as a function of a result of the readiness check, for example, to start a charging operation, and/or to output an alert, for example, a warning alert. Advantageously, it is possible to omit a manual readiness check of electrical units. Advantageously, it is possible to enable a convenient and user-friendly readiness check of electrical units.

Furthermore, it is proposed that the control and/or regulating unit is configured to control and/or regulate a charging operation of the electrical unit, as a function of an evaluation of the item of non-charging-related object information and/or the item of vehicle information. In particular, the control and/or regulating unit is configured to control and/or regulate at least one charging device of the data and/or command device and/or at least one external charging device, for controlling and/or regulating the charging operation of the electrical unit. In particular, the control and/or regulating unit can be configured to control and/or regulate the charging operation of the electrical unit as a function of a route profile of the vehicle, for example, to charge an energy storage device of the electrical unit by means of regenerated energy while the vehicle is driving downhill, to interrupt the charging operation of the electrical unit during a traffic jam, or the like. Preferably, the control and/or regulating unit is configured to control and/or regulate the charging operation of the electrical unit, as a function of an evaluation of time parameters, location parameters, and/or task information. Advantageously, it is possible to enable convenient and efficient charging of electrical units.

Furthermore, it is proposed that the control and/or regulating unit is configured to output at least one motivational alert, as a function of an evaluation of the item of non-charging-related object information and/or the item of vehicle information. Preferably, the control and/or regulating unit is configured for outputting the motivational alert via the output unit of the data and/or command device, via an external device, and/or via an output unit which is arranged at the electrical unit. The motivational alert can be configured in particular as a display and/or credit voucher of bonus points; as a granting of a warranty extension, as a provision of a coupon, for example, a service coupon; as a summary of a compliance with work assignments; as a comparison of use with at least one colleague; as an award, for example, as the craftsman of the month; as a signal; as a, in particular motivational, slogan; as a granting of a rebate; as a provision of an upgrade; as a provision of a test device; as an invitation to an event; as a provision of a gift; as a recruitment; as an advertising medium; or as another motivational alert which is considered by those skilled in the art to be reasonable. An item of non-charging-related object information which is to be evaluated with respect to a motivational alert can be configured in particular as a rotational speed at which the electrical unit is operated, a load under which the electrical unit is operated, a temperature range in which the electrical unit is operated, or the like. An item of vehicle information to be evaluated with respect to a motivational alert can be configured in particular as a charging state of the vehicle, as a charging frequency of the vehicle, or the like. Preferably, the control and/or regulating unit is configured, in particular for outputting a motivational alert, to collect and evaluate a plurality of non-charging related object information and/or vehicle information over a predetermined period of time, for example, a week or a month. For example, a data and/or command device can be provided, by means of which it is possible to enable motivation of users of electrical units.

In addition, it is proposed that the control and/or regulating unit is configured to output at least one charging alert, as a function of an evaluation of the item of non-charging-related object information and/or the item of vehicle information. The charging alert can be configured in particular as an alert about where an arrangement of the electrical unit is expedient inside the vehicle, for example, in a charging device; as an alert as to whether all electrical units required for a task are arranged in the vehicle or whether electrical units are missing; or the like. Advantageously, it is possible to enable correct, convenient, and/or complete charging of the vehicle.

In addition, it is proposed that the control and/or regulating unit is configured to activate or deactivate the electrical unit for use, as a function of an evaluation of the item of non-charging-related object information and/or of the item of vehicle information. In particular, the control and/or regulating unit can be configured to activate or to deactivate the electrical unit as a function of a person situated in the vehicle, in particular as a function of an approval for authorization of the person; as a function of a sensor, for example, a camera or a motion sensor, of the vehicle; as a function of motion of the vehicle; as a function of opening or closing of the vehicle; or the like. Alternatively or in addition to activating or deactivating the electrical unit, the control and/or regulating unit is preferably configured to output an alarm alert; to identify a user of the electrical unit, for example, with the aid of a smartphone identification, an authorization card, a vehicle key identification, or the like; to record a video and/or an image of the user; and/or to carry out an inventory comparison of the vehicle, in particular linked to time or and/or location data and/or a user identification. Advantageously, it is possible to enable a convenient, in particular automatic, authorization of electrical units.

Furthermore, it is proposed that the control and/or regulating unit is configured to provide at least one use history of the electrical unit and/or the vehicle, as a function of an evaluation of the item of non-charging-related object information and/or the item of vehicle information. The use history can in particular comprise information about when which vehicle was equipped with which electrical unit, which user removed which electrical unit from the vehicle or inserted it in the vehicle, the reason for which an energy storage device, in particular a rechargeable battery, of an electrical unit was discharged, for example, due to self-discharge as a consequence of a low temperature in the vehicle, or the like. Advantageously, it is possible to enable an overview of use of the electrical unit and/or the vehicle.

Furthermore, the present disclosure is directed to a data and/or command system comprising at least one data and/or command device, in particular a data and/or command device according to the present disclosure, and comprising at least one electrical unit, in particular a hand-held power tool.

It is proposed that the data and/or command system comprises at least one vehicle for transport of the electrical unit, wherein the vehicle comprises at least one electronics unit which is configured to provide the data and/or command device with at least one item of vehicle information of the vehicle. In particular, the electronics unit is configured to provide the item of vehicle information, in particular in the form of electronic data, to the control and/or regulating unit, in particular via the communication unit of the data and/or command device. Preferably, the vehicle is configured as a road vehicle, for example, as a van, as a light commercial vehicle, as a truck, or the like. Alternatively, it is conceivable that the vehicle is configured as a train, as a ship, as a helicopter, as a drone, or the like. Preferably, the vehicle comprises a cargo bay for storing the electrical unit. Preferably, the vehicle is provided for transporting a plurality of electrical units, in particular a bevy of electrical units. "Provided" is to be understood to mean in particular "specifically designed" and/or "specifically equipped." "An object is provided for a specific function" is to be understood to mean in particular that the object fulfills and/or carries out this specific function in at least one application state and/or operating state. An "electronics unit" is to be understood to mean in particular a unit comprising at least one electronic control system. Preferably, the electronics unit is configured as automotive electronics of the vehicle. Alternatively, it is conceivable that the vehicle comprises an electronics unit which is configured separate from the automotive electronics. In particular, the electronics unit can comprise at least one sensor unit for collecting the item of vehicle information. Preferably, the data and/or command device is arranged at and/or in the vehicle. Alternatively, it is conceivable that the data and/or command device is arranged separate from the vehicle. For providing the item of vehicle information, the electronics unit is preferably electrically conductively connected to the communication unit and/or to the control and/or regulating unit of the data and/or command device. Alternatively, it is conceivable that the electronics unit is configured to transmit the item of vehicle information wirelessly to the data and/or command device, in particular to the communication unit of the data and/or command device. Advantageously, vehicle information can be provided to the data and/or command device directly from the vehicle.

In addition, it is proposed that the vehicle is configured as an autonomous vehicle, which is provided for autonomous transport of the electrical unit, as a function of an evaluation of at least one item of non-charging-related object information of the electrical unit and/or the item of vehicle information. Preferably, the control and/or regulating unit of the data and/or command device, and/or the electronics unit of the vehicle, are/is configured for an evaluation of the item of non-charging-related object information and/or the item of vehicle information. In particular, the autonomous vehicle is configured to deliver the electrical unit autonomously to a location of use, for example, a construction site. Preferably, the autonomous vehicle is configured for transport of the electrical unit as a function of the time of day and/or as a function of demand. An item of vehicle information which is to be evaluated with respect to autonomous transport of the electrical unit can be configured in particular as an average speed of the vehicle, as energy consumption of the vehicle, as a service provided by means of the vehicle in addition to the transport of the electrical unit, for example, passenger transport or food delivery, as a booked distribution charge, or the like. Advantageously, it is possible to enable efficient, in particular automatic, transport of electrical units.

In addition, the present disclosure is directed to a data and/or command system, in particular a data and/or command system according to the present disclosure, comprising at least one data and/or command device, in particular a data and/or command device according to the present disclosure.

It is proposed that the data and/or command system comprises at least one virtual reality unit, which is configured for outputting an alert in an at least partially virtual environment, as a function of an evaluation of at least one item of non-charging-related object information of at least one electrical unit and/or at least one item of vehicle information of at least one vehicle. The virtual reality unit is configured in particular for outputting an alert, in particular outputting a motivational alert, in a virtual reality and/or in an augmented reality. In particular, the virtual reality unit is configured for outputting an alert as a function of an evaluation of the item of non-charging-related object information and/or the item of vehicle information, which is carried out by the control and/or regulating unit. Preferably, the virtual reality unit can be configured as virtual-reality glasses, as a virtual-reality helmet visor, as augmented reality glasses, as an augmented-reality helmet visor, as a smartphone, in particular having a head strap, or the like. Preferably, the virtual reality unit comprises at least one, in particular wireless, communication unit for communicating with the data and/or command device, in particular with the control and/or regulating unit, via the communication unit of the data and/or command device. Preferably, the virtual reality unit is configured for a virtual display of bonus points, for superposition of alerts with an actual environment, for example, for bonus points which are obtained by operating a particular object, or the like, as a function of an evaluation of the item of non-charging-related object information and/or the item of vehicle information. Advantageously, it is possible to enable the issuing of a graphic alert, in particular for the purpose of motivation.

Preferably, the data and/or command system comprises at least one attachment device which is provided for an at least essentially fixed attachment of the data and/or command device, in particular to a vehicle. Preferably, the attachment device is provided to attach the data and/or command device in a fixed manner, under the effect of forces which occur, for example, during motion of the vehicle. Preferably, the attachment device is provided for attachment of the data and/or command device in a vehicle. Alternatively, it is conceivable that the attachment device is provided for attachment of the data and/or command device in a container, in a building, or the like. In particular, the attachment device is configured as a docking station which is provided for accommodating the data and/or command device in particular in a positive and/or non-positive manner. The attachment device comprises in particular a volume between 5,000 cm3 and 30,000 cm3, preferably a volume between 15,000 cm3 and 25,000 cm3, and particularly preferably a volume of 22,000 cm3.

Preferably, the attachment device comprises at least one fixing unit which is provided to fix at least one base body of the attachment device to at least one surface, at least essentially in a tamper-proof manner. Preferably, fixing the base body of the attachment device to a surface by means of the fixing unit is in particular non-destructive, is at least essentially non-detachable, or is detachable only through the use of a special tool. The base body preferably comprises at least essentially a docking station for the data and/or command device. The surface can be arranged in particular on a roof of the vehicle, on a side wall of a cargo bay of the vehicle, on a container, or the like. The fixing unit can in particular comprise screws for fixing the base body, wherein screw heads of the screws can be at least essentially inaccessibly covered by means of cover elements. The fixing unit can comprise in particular at least one glue, in particular an industrial glue, for forming a chemical bond of the base body with the surface. The fixing unit can comprise in particular at least one installation belt, in particular a lashing strap or a metal installation belt, for fixing the base body, wherein, in a state of the data and/or command device being arranged at the attachment device, a lock of the installation belt is at least essentially inaccessibly covered by means of the data and/or command device. The fixing unit can comprise in particular at least one, in particular flat, magnet for fixing the base body.

Preferably, the attachment device is configured as a toolbox which is provided for accommodating the data and/or command device. In particular, the toolbox is configured as a lockable toolbox. Preferably, the toolbox can be arranged in the vehicle, in particular at least essentially in a fixed manner. Preferably, the toolbox can be arranged at least essentially in a custom-fit manner in a rack which is arranged in particular in the vehicle.

Preferably, the attachment device comprises at least one theft protection unit which is provided for securing the data and/or command device to the base body of the attachment device. Preferably, the theft protection unit comprises at least one safety tether, in particular a steel safety tether, which is provided for securing the data and/or command device to the base body of the attachment device, and which is lockable in particular by means of a lock of the theft protection unit. Alternatively, it is conceivable that the theft protection unit comprises a least one clamp, one hook, or the like, which is provided for securing the data and/or command device to the base body, and which is lockable in particular by means of a lock of the theft protection unit and/or electrically.

Preferably, the attachment device comprises at least one charging unit which is provided to charge the data and/or command device, in particular inductively. The charging unit is preferably configured at least partially integrated into the base body of the attachment device. Preferably, the charging unit is configured as an inductive charging device. Alternatively, it is conceivable that the charging unit is configured as a conventional charging device having charging contacts. Preferably, the charging unit comprises an integrated energy storage device, for example, a rechargeable battery, or a power supply, for example, for supplying power from the electrical system of the vehicle.

Furthermore, the present disclosure is directed to a method for operating a data and/or command device, in particular a data and/or command device according to the present disclosure, and/or for operating a data and/or command system, in particular a data and/or command system according to the present disclosure.

It is proposed that in at least one method step, at least one alert is output, and/or the electrical unit is controlled and/or regulated, as a function of an evaluation of at least one item of non-charging-related object information of at least one electrical unit, in particular a hand-held power tool, and/or as a function of at least one item of vehicle information of at least one vehicle. Advantageously, a method can be provided for convenient, user-friendly, and/or motivational management, control, and/or regulation of electrical units, in particular in a vehicle and/or together with a vehicle.

The data and/or command device according to the present disclosure, the data and/or command system according to the present disclosure, and/or the method according to the present disclosure are/is not to be limited to the above-described application and embodiment. In particular, for fulfilling a functionality described herein, the data and/or command device according to the present disclosure, the data and/or command system according to the present disclosure, and/or the method according to the present disclosure can comprise a number of individual elements, components, units, and method steps which differs from a number mentioned herein. In addition, in the case of the value ranges specified in this disclosure, values lying within the mentioned limits are also to be considered to be disclosed and as being arbitrarily applicable.

BRIEF DESCRIPTION OF THE DRAWINGS

Additional advantages result from the following description of the drawings. The drawings depict an exemplary embodiment of the present disclosure. The drawings, the description, and the disclosure contain numerous features in combination. Those skilled in the art will also advantageously consider the features individually and combine them into reasonable additional combinations.

The following are depicted.

DETAILED DESCRIPTION

Figure 1:
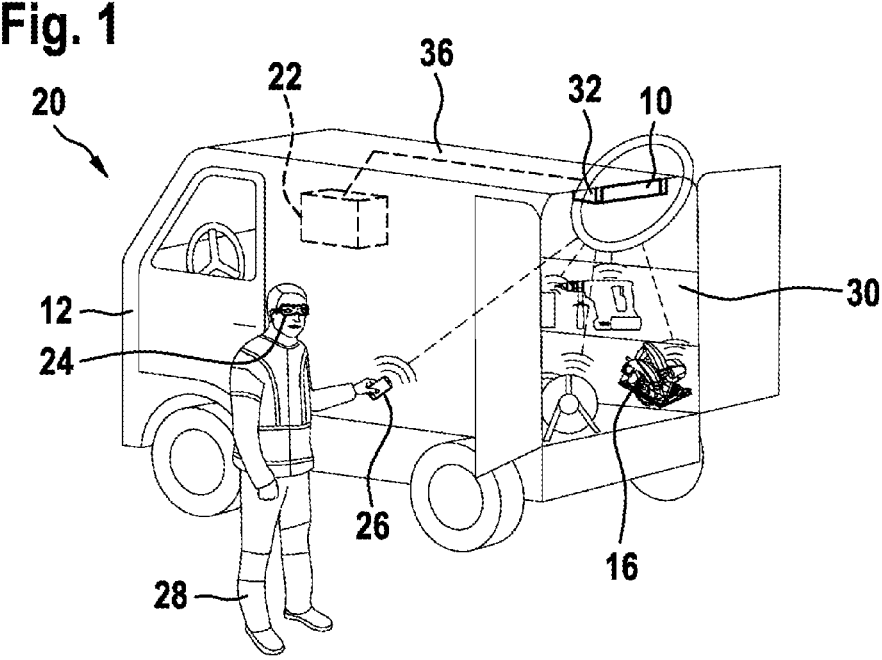
FIG. 1 depicts a perspective view of a data and/or command system according to the present disclosure.

FIG. 1 depicts a perspective view of a data and/or command system 20. The data and/or command system 20 comprises a data and/or command device 10, an electrical unit 16, a vehicle 12, and a virtual reality unit 24. Alternatively, it is conceivable that the data and/or command system 20 comprises only the data and/or command device 10 and the electrical unit 16, or only the data and/or command device 10, the electrical unit 16, and either the vehicle 12 or the virtual reality unit 24. The data and/or command device 10, in particular for vehicles 12, comprises at least one communication unit 14 for receiving at least one item of non-charging-related object information of at least one electrical unit 16, in particular a hand-held power tool, and/or at least one item of vehicle information of at least one vehicle 12 in which the electrical unit 16 is arranged. The data and/or command device 10 comprises at least one control and/or regulating unit 18 (see FIG. 2) which is configured to output at least one alert and/or to control and/or regulate the electrical unit 16, as a function of an evaluation of the item of non-charging-related object information and/or the item of vehicle information.

The data and/or command device 10 is configured as a gateway. The data and/or command device 10, in particular the control and/or regulating unit 18, is associated with a bevy of electrical units 16. A bevy of electrical units 16 is a plurality of associated electrical units 16 which is preferably associated with a work crew, the vehicle 12, a work project, or the like. A plurality of electrical units 16 is arranged in the vehicle 12. The control and/or regulating unit 18 is configured to evaluate non-charging-related object information of the plurality of electrical units 16 and/or to control and/or regulate the plurality of electrical units 16. The data and/or command device 10, in particular the control and/or regulating unit 18, is configured for arrangement in spatial proximity to the electrical unit 16, for example, in a same vehicle 12, in a same storage unit, in a same workshop, or the like, as the electrical unit 16. An arrangement of the data and/or command device 10 in a spatial proximity to the electrical unit 16 enables communication between the data and/or command device 10 and the electrical unit 16 via short-range communication links, for example, Bluetooth, WLAN, NFC, or the like. Communication by the data and/or command device 10 is indicated in FIG. 1 by a ring around the data and/or command device 10, and dashed lines to various devices. The data and/or command device 10, in particular the control and/or regulating unit 18, is configured for use, in particular arrangement, in the vehicle 12. The vehicle 12 is configured for transport of the electrical unit 16. Alternatively or in addition, it is also conceivable that the data and/or command device 10, in particular the control and/or regulating unit 18, is configured for use, in particular arrangement, in a storage unit, in a workshop, at a construction site, or the like. The communication unit 14 is configured for receiving and/or transmitting electronic data. The item of non-charging-related object information of the electrical unit 16 and/or the item of vehicle information are/is provided to the communication unit 14 in the form of electronic data.

The electrical unit 16 is configured as a unit which can be operated by means of electrical energy. The electrical unit 16 is configured as a machine tool, in particular as a hand-held power tool. FIG. 1 depicts the electrical unit 16 by way of example as a circular saw. However, the electrical unit 16 can also be configured as a drill, as a drill hammer and/or chipping hammer, as a battery-operated screwdriver, as an angle grinder, as a gardening tool, or the like. Alternatively or in addition, it is conceivable that the electrical unit 16 is configured as an electrical device which is different from a machine tool, for example, as a laptop, as a tablet, as a smartphone, as a digital camera, or the like. The electrical unit 16 comprises at least one communication unit (not depicted here), which is configured in a manner which is in particular at least essentially analogous to that of the communication unit 14 of the data and/or command device 10. The communication unit of the electrical unit 16 is configured to provide the item of non-charging-related object information to the data and/or command device 10, in particular to the control and/or regulating unit 18, via the communication unit 14 of the data and/or command device 10. The control and/or regulating unit 18 is configured to control and/or regulate a plurality of different electrical units 16, in particular at least essentially simultaneously.

The item of non-charging-related object information is an item of information about the electrical unit 16, which the electrical unit 16 preferably provides itself. The item of non-charging-related object information is independent of charging, in particular of a charging state and of a charging operation, of the electrical unit 16. The item of non-charging-related object information can be configured as an operating temperature of the electrical unit 16, as a rotational speed of a drive unit of the electrical unit 16, as a kind of insertion tool attached to the electrical unit 16, as a force acting on the electrical unit 16, in particular an operator force, as an acceleration parameter of the electrical unit 16, as a pressure parameter of the electrical unit 16, or as another item of non-charging-related object information which is considered by those skilled in the art to be reasonable. The item of vehicle information relates to transport of the electrical unit 16, and/or relates to the vehicle 12 which is configured for transport of the electrical unit 16. The item of vehicle information can be configured as a transport speed of the vehicle 12, as a position of the vehicle 12 transporting the electrical unit 16, as a range of the vehicle 12, as a route profile of a route of the vehicle 12, as energy consumption, in particular fuel consumption, of the vehicle 12, or as another item of vehicle information which is considered by those skilled in the art to be reasonable. The control and/or regulating unit 18 is configured to evaluate the item of non-charging-related object information and/or the item of vehicle information. The control and/or regulating unit 18 can comprise a circuit which is configured for an evaluation of the item of non-charging-related object information and/or the item of vehicle information, an evaluation program which is stored in a memory unit of the control and/or regulating unit 18, or the like. The control and/or regulating unit 18 is configured to evaluate a combination of a plurality of in particular different items of non-charging-related object information and/or vehicle information, in particular of a plurality of electrical units 16. The control and/or regulating unit 18 is configured to evaluate other information, for example, from a planning system, in particular a BIM (building infrastructure model), from external sensors, from a server, or the like.

The control and/or regulating unit 18 is configured to output a plurality of alerts and/or to control and/or regulate a plurality of electrical units 16, as a function of an evaluation of the item of non-charging-related object information and/or the item of vehicle information. The alert can be configured as a motivational alert, as a charging alert, as an alarm alert, or the like. The alert is configured as an optical alert, as an acoustic alert, and/or as a haptic alert. The control and/or regulating unit 18 is configured to output the alert indirectly, for example, via an output unit of the data and/or command device 10, for example, a display screen, a loudspeaker, a vibration motor, or the like; or via an external device 26. The external device 26, which is operated in FIG. 1 by a person 28, is, for example, configured as a smartphone. Alternatively, it is conceivable that the external device 26 is configured as a tablet, as virtual-reality glasses, or the like. Control and/or regulation 16 of the electrical unit can be configured as a readiness check, as a charging operation, as an activation or deactivation, or the like.

The control and/or regulating unit 18 is configured to carry out a readiness check of the electrical unit 16, as a function of an evaluation of the item of non-charging-related object information and/or the item of vehicle information. An item of vehicle information which is to be evaluated with respect to the readiness check can be configured as a remaining travel time to a location of use, for example, a construction site. For conducting a readiness check, the control and/or regulating unit 18 is configured to check a charging state of the electrical unit 16, a maintenance state of the electrical unit 16, insertion tools which are available for use with the electrical unit 16, a final safety check of the electrical unit 16, or the like. The control and/or regulating unit 18 is configured for a readiness check as a function of an evaluation of task-related information, for example, about a type of electrical unit 16 required for a task. The control and/or regulating unit 18 is configured to control and/or regulate the electrical unit 16, as a function of a result of the readiness check, for example, to start a charging operation, and/or to output an alert, for example, a warning alert.

The control and/or regulating unit 18 is configured to control and/or regulate a charging operation of the electrical unit 16, as a function of an evaluation of the item of non-charging-related object information and/or the item of vehicle information. The control and/or regulating unit 18 is configured to control and/or regulate at least one charging device of the data and/or command device 10 and/or at least one external charging device, for controlling and/or regulating the charging operation of the electrical unit 16. The control and/or regulating unit 18 can be configured to control and/or regulate the charging operation of the electrical unit 16 as a function of a route profile of the vehicle 12, for example, to charge an energy storage device of the electrical unit 16 by means of regenerated energy when the vehicle 12 drives downhill, to interrupt the charging operation of the electrical unit 16 during a traffic jam, or the like. The control and/or regulating unit 18 is configured to control and/or regulate the charging operation of the electrical unit 16 as a function of an evaluation of time parameters, location parameters, and/or task information.

The control and/or regulating unit 18 is configured to output at least one motivational alert as a function of an evaluation of the item of non-charging-related object information and/or the item of vehicle information. The control and/or regulating unit 18 is configured for outputting the motivational alert via the output unit of the data and/or command device 10 (not depicted further here), via the external device 26, and/or via an output unit arranged at the electrical unit 16. The motivational alert can be configured in particular as a display and/or credit voucher of bonus points; as a granting of a warranty extension, as a provision of a coupon, for example, a service coupon; as a summary of a compliance with work assignments; as a comparison of use with at least one colleague; as an award, for example, as the craftsman of the month; as a signal, in particular as a motivational speech; as a granting of a rebate; as a provision of an upgrade; as a provision of a test device; as an invitation to an event; as a provision of a gift; as a recruitment; as an advertising medium; or as another motivational alert which is considered by those skilled in the art to be reasonable. An item of non-charging-related object information which is to be evaluated with respect to a motivational alert can be configured as a rotational speed at which the electrical unit 16 is operated, a load under which the electrical unit 16 is operated, a temperature range in which the electrical unit 16 is operated, or the like. An item of vehicle information to be evaluated with respect to a motivational alert can be configured as a charging state of the vehicle 12, as a charging frequency of the vehicle 12, or the like. The control and/or regulating unit 18 is configured, in particular for outputting a motivational alert, to collect and evaluate a plurality of non-charging related object information and/or vehicle information over a predetermined period of time, for example, a week or a month.

The control and/or regulating unit 18 is configured to output at least one charging alert as a function of an evaluation of the item of non-charging-related object information and/or the item of vehicle information. The charging alert can be configured as an alert where an arrangement of the electrical unit 16 is expedient inside the vehicle 12, for example, in a charging device, as an alert as to whether all electrical units 16 required for a task are arranged in the vehicle 12, or whether electrical units 16 are missing, or the like.

The control and/or regulating unit 18 is configured to activate or deactivate the electrical unit 16 for use, as a function of an evaluation of the item of non-charging-related object information and/or the item of vehicle information. The control and/or regulating unit 18 can be configured to activate or deactivate the electrical unit 16 as a function of a person 28 situated in the vehicle 12, in particular as a function of an approval for authorization of the person 28; as a function of a sensor, for example, a camera or a motion sensor of the vehicle 12; as a function of motion of the vehicle 12; as a function of an opening or closing of the vehicle 12; or the like. Alternatively or in addition to activating or deactivating the electrical unit 16, the control and/or regulating unit 18 is configured to output an alarm alert; to identify a user of the electrical unit 16, for example, with the aid of a smartphone identification, an authorization card, a vehicle key identification, or the like; to record a video and/or an image of the user; and/or to carry out an inventory comparison of the vehicle 12, in particular linked to time or and/or location data and/or a user identification.

The control and/or regulating unit 18 is configured to provide at least one use history of the electrical unit 16 and/or the vehicle 12, as a function of an evaluation of the item of non-charging-related object information and/or the item of vehicle information. The use history can comprise information about when which vehicle 12 was equipped with which electrical unit 16, which user removed which electrical unit 16 from the vehicle 12 or inserted it into the vehicle 12, the reason for which an energy storage device, in particular a rechargeable battery, of an electrical unit 16 was discharged, for example, due to self-discharge as a consequence of a low temperature in the vehicle 12, or the like.

The data and/or command system 20 comprises at least one vehicle 12 for transport of the electrical unit 16, wherein the vehicle 12 comprises at least one electronics unit 22 which is configured to provide the data and/or command device 10 with at least one item of vehicle information of the vehicle 12. The electronics unit 22 is configured to provide the item of vehicle information, in particular in the form of electronic data, to the control and/or regulating unit 18, in particular via the communication unit 14 of the data and/or command device 10. The vehicle 12 is configured as a road vehicle. The vehicle 12 is configured as a van. Alternatively, it is conceivable that the vehicle 12 is configured as a road vehicle which is configured differently than a van, for example, as a light commercial vehicle, as a truck, or the like; or as a train, as a ship, as a helicopter, as a drone, or the like. The vehicle 12 comprises a cargo bay for storing the electrical unit 16. The vehicle 12 is provided for transporting a plurality of electrical units 16, in particular a bevy of electrical units 16. The electronics unit 22 is configured as automotive electronics of the vehicle 12. Alternatively, it is conceivable that the vehicle 12 comprises an electronics unit 22 which is separate from the automotive electronics. The electronics unit 22 can comprise at least one sensor unit for collecting the item of vehicle information (not depicted further here). The data and/or command device 10 is arranged at, in particular in, the vehicle 12. The data and/or command device 10 is arranged in the cargo bay 30 of the vehicle 12, by means of an attachment device 32 of the data and/or command system 20 (see FIG. 3). Alternatively, it is conceivable that the data and/or command device 10 is arranged separate from the vehicle 12. For providing the item of vehicle information, the electronics unit 22 is electrically conductively connected to the communication unit 14 and/or to the control and/or regulating unit 18 of the data and/or command device 10. Alternatively, it is conceivable that the electronics unit 22 is configured to transmit the item of vehicle information wirelessly to the data and/or command device 10, in particular to the communication unit 14 of the data and/or command device 10.

The vehicle 12 is configured as an autonomous vehicle which is provided for autonomous transport of the electrical unit 16, as a function of an evaluation of at least one item of non-charging-related object information of the electrical unit 16 and/or the item of vehicle information. Alternatively, it is conceivable that the vehicle 12 is configured as a conventional driver-operated vehicle. The control and/or regulating unit 18 of the data and/or command device 10, and/or the electronics unit 22 of the vehicle 12, are/is configured for an evaluation of the item of non-charging-related object information and/or the item of vehicle information. The vehicle 12 is configured to deliver the electrical unit 16 autonomously to a location of use, for example, a construction site. The vehicle 12 is configured for transport of the electrical unit 16 which is a function of the time of day and/or which is a function of demand. An item of vehicle information which is to be evaluated with respect to autonomous transport of the electrical unit 16 can be configured as an average speed of the vehicle 12, as energy consumption of the vehicle 12, as a service provided by means of the vehicle 12 in addition to the transport of the electrical unit 16, for example, passenger transport or food delivery, as a booked distribution charge, or the like.

The data and/or command system 20 comprises at least one virtual reality unit 24 which is configured for outputting an alert in an at least partially virtual environment, as a function of an evaluation of at least one item of non-charging-related object information of at least one electrical unit 16 and/or at least one item of vehicle information of at least one vehicle 12. The virtual reality unit 24 is configured for outputting an alert, in particular outputting a motivational alert, in a virtual reality and/or in an augmented reality. The virtual reality unit 24 is configured for outputting an alert as a function of an evaluation of the item of non-charging-related object information and/or the item of vehicle information, which is carried out by the control and/or regulating unit 18. The virtual reality unit 24 is configured as augmented reality glasses. Alternatively, it is conceivable that the virtual reality unit 24 is configured as virtual-reality glasses, as a virtual-reality helmet visor, as an augmented-reality helmet visor, as a smartphone, in particular having a head strap, or the like. The virtual reality unit 24 is arranged on a face of the person 28. The person 28 is configured as a user of the electrical unit 16, in particular as a manual laborer. The virtual reality unit 24 comprises at least one, in particular wireless, communication unit for communicating with the data and/or command device 10, in particular with the control and/or regulating unit 18, via the communication unit 14 of the data and/or command device 10 (not depicted further here). The virtual reality unit 24 is configured for a virtual display of bonus points, for superposition of alerts with an actual environment, for example, for bonus points which are obtained by operating a particular object, or the like, as a function of an evaluation of the item of non-charging-related object information and/or the item of vehicle information.

The data and/or command system 20 comprises at least one attachment device 32 which is provided for an at least essentially fixed attachment of the data and/or command device 10, in particular to a vehicle 12. The attachment device 32 is provided to attach the data and/or command device 10 in a fixed manner, under the effect of forces which, occur, for example, during motion of the vehicle 12. The attachment device 32 is provided for attachment of the data and/or command device 10 in the vehicle 12. Alternatively, it is conceivable that the attachment device 32 is provided for attachment of the data and/or command device 10 in a container, in a building, or the like. The attachment device 32 is configured as a docking station which is provided for accommodating the data and/or command device 10 in particular in a positive and/or non-positive manner. The attachment device 32 comprises in particular a volume between 5,000 cm3 and 30,000 cm3, preferably a volume between 15,000 cm3 and 25,000 cm3, and particularly preferably a volume of 22,000 cm3.

The attachment device 32 comprises at least one fixing unit which is provided to fix at least one base body 34 of the attachment device 32 to at least one surface, at least essentially in a tamper-proof manner (not further depicted here). Fixing the base body 34 of the attachment device 32 to the surface by means of the fixing unit is in particular non-destructive, is at least essentially non-detachable, or is detachable only through the use of a special tool. The base body 34 comprises at least essentially a docking station for the data and/or command device 10. The surface is configured as an inner side of a roof 36 of the vehicle 12. Alternatively, it is conceivable that the surface is arranged on a side wall of the cargo bay 30 of the vehicle 12, on a container, or the like. The fixing unit can comprise screws for fixing the base body 34, wherein screw heads of the screws can be at least essentially inaccessibly covered by means of cover elements. The fixing unit can comprise at least one glue, in particular an industrial glue, for forming a chemical bond of the base body 34 with the surface. The fixing unit can comprise at least one installation belt, in particular a lashing strap or a metal installation belt, for fixing the base body 34, wherein, in a state of the data and/or command device 10 being arranged on the attachment device 32, a lock of the installation belt is at least essentially inaccessibly covered by means of the data and/or command device 10. The fixing unit can comprise in particular at least one, in particular flat, magnet for fixing the base body 34.

The attachment device 32 comprises at least one charging unit which is provided to charge the data and/or command device 10, in particular inductively (not depicted further here). The charging unit is at least partially integrated into the base body 34 of the attachment device 32. The charging unit is configured as an inductive charging device. Alternatively, it is conceivable that the charging unit is configured as a conventional charging device having charging contacts. The charging unit comprises an integrated energy storage device, for example, a rechargeable battery, or a power supply, for example, for supplying power from the electrical system of the vehicle 12.

Figure 2:
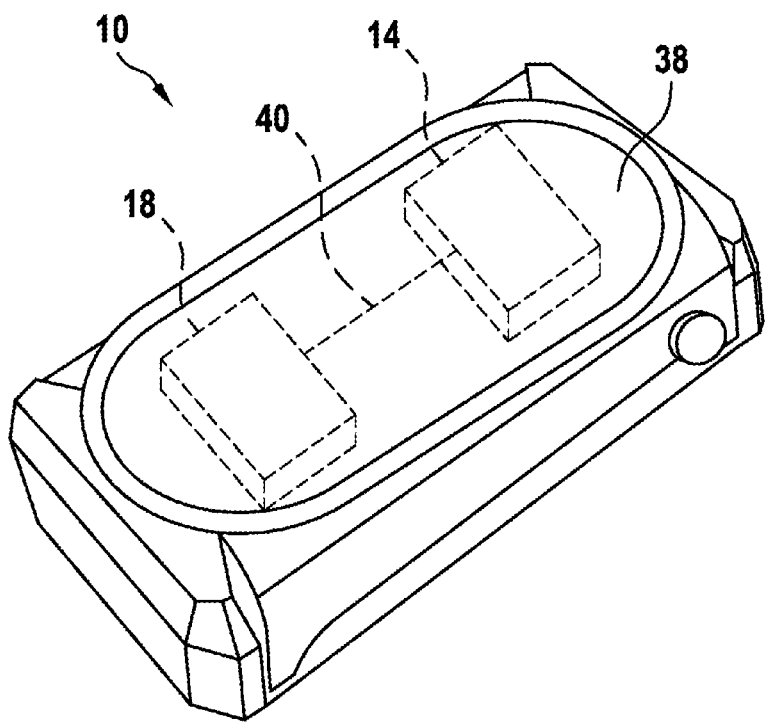
FIG. 2 depicts a perspective view of a data and/or command device according to the present disclosure, of the data and/or command system according to the present disclosure.

FIG. 2 depicts a perspective view of the data and/or command device 10 of the data and/or command system 20. The control and/or regulating unit 18 and the communication unit 14 are arranged inside a housing 38 of the data and/or command device 10. The control and/or regulating unit 18 is configured as a microcontroller. Alternatively, it is conceivable that the control and/or regulating unit 18 is configured as a computer, for example, a stationary computer, a laptop, a server, or the like; as an integrated circuit, or the like. The control and/or regulating unit 18 is integrated into a gateway. Alternatively, it is conceivable that the control and/or regulating unit 18 is at least partially configured as a gateway.

The communication unit 14 is configured as a wireless communication unit. The communication unit 14 is, for example, configured as a Bluetooth module. Alternatively, it is conceivable that the communication unit 14 is configured as a radio module, as a WLAN module, as an NFC module, or as a wired communication unit which comprises a wired connection, for example, via an Ethernet cable or the like, for receiving and/or transmitting electronic data. The communication unit 14 is configured to provide the received electronic data, in particular the item of non-charging-related object information and/or the item of vehicle information, to the control and/or regulating unit 18, in particular via a wired data line 40. Alternatively, it is conceivable that the communication unit 14 is configured to provide the received electronic data to the control and/or regulating unit 18 via a wireless data line.

Figure 3:
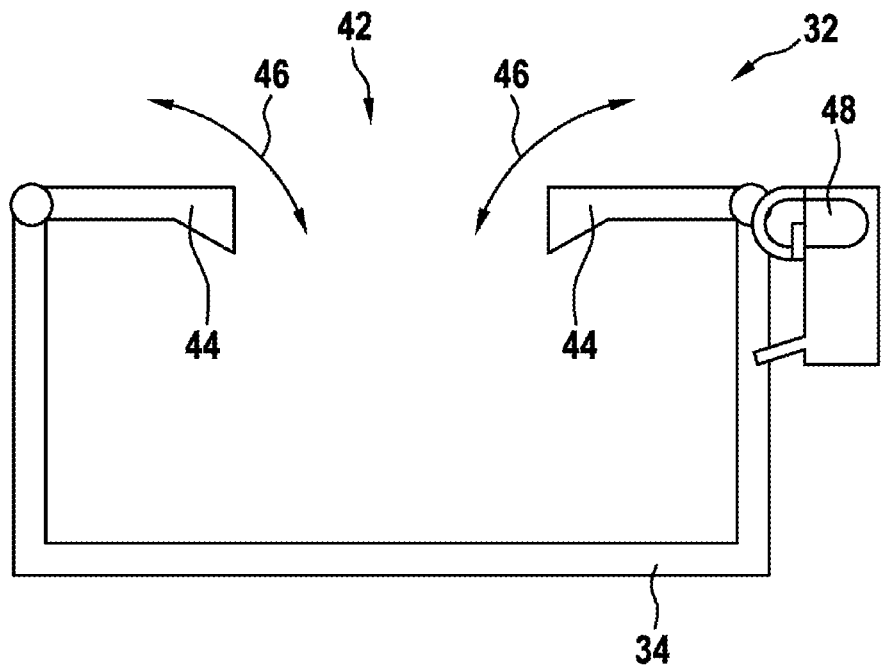
FIG. 3 depicts a schematic cross-sectional view of an attachment device of the data and/or command system according to the present disclosure.

FIG. 3 depicts a schematic perspective view of the attachment device 32 of the data and/or command system 20. The attachment device 32 comprises at least one theft protection unit 42 which is provided for securing the data and/or command device 10 to the base body 34 of the attachment device 32. For the sake of clarity, the data and/or command device 10 is not depicted further in FIG. 3. The theft protection unit 42 comprises two hooks 44 which are provided for securing the data and/or command device 10 to the base body 34 of the attachment device 32. As indicated by the directional arrows 46, the hooks 44 are arranged for fixing the data and/or command device 10 pivotably to the base body 34. The theft protection unit 42 comprises a lock 48 which is provided for locking the hooks 44. The lock 48 is configured, for example, as a mechanical lock. However, the lock 48 can also be configured as an electric lock. Alternatively to the hooks 44, the theft protection unit 42 can also comprise clamps. Furthermore, alternatively, it is conceivable that the theft protection unit 42 comprises at least one safety tether, in particular a steel safety tether, which is provided for securing the data and/or command device to the base body 34 of the attachment device 32, and which is lockable by means of the lock 48 of the theft protection unit 42.

Figure 4:
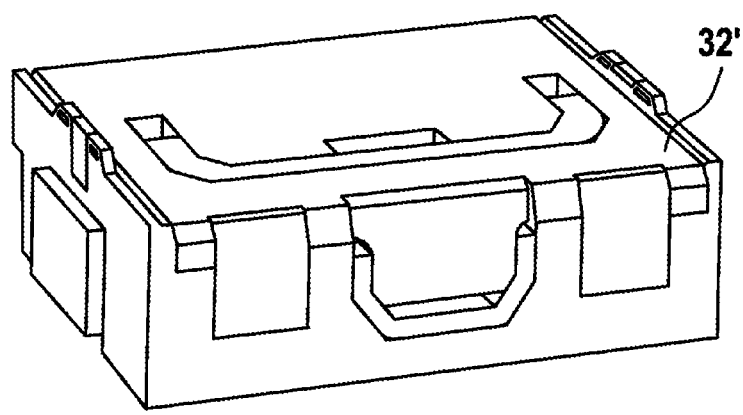
FIG. 4 depicts a schematic representation of an alternative attachment device of the data and/or command system according to the present disclosure.

FIG. 4 depicts a perspective view of an alternative attachment device 32' of the data and/or command system 20. The attachment device 32' is configured as a toolbox which is provided for accommodating the data and/or command device 10. The attachment device 32' is configured as a lockable toolbox. The attachment device 32' can be arranged in the vehicle 12, in particular at least essentially in a fixed manner. The attachment device 32' can be arranged at least essentially in a custom-fit manner in a rack which is arranged in particular in the vehicle 12.

A method for operating the data and/or command device 10 and/or for operating the data and/or command system 20 will be described below. In at least one method step, at least one alert is output, and/or the electrical unit 16 is controlled and/or regulated, as a function of an evaluation of at least one item of non-charging-related object information of at least one electrical unit 16, in particular a hand-held power tool, and/or of at least one item of vehicle information of at least of one vehicle 12. With respect to further method steps of the method for operating the data and/or command device 10 and/or for operating the data and/or command system 20, it is possible to refer to the preceding description of the data and/or command device 10 and/or the data and/or command system 20, since this description is also to be read in a manner which is analogous to the method; thus, all features with respect to the data and/or command device 10 and/or with respect to the data and/or command system 20 are also to be considered to be disclosed with respect to the method for operating the data and/or command device 10 and/or for operating the data and/or command system 20.

The invention claimed is:
1. A data and/or command device for vehicles, comprising:
   at least one communication unit configured to receive at least one of (i) non-charging-related object information of an electrical unit, and (ii) vehicle information of at least one vehicle in which the electrical unit is arranged; and at least one control and/or regulating unit configured to (i) output at least one alert, and (ii) control and/or regulate the electrical unit, as a function of an evaluation of at least one of the non-charging-related object information and the vehicle information, wherein the control and/or regulating unit is configured to start or to stop a charging operation of the electrical unit based on the evaluation, and wherein the control and/or regulating unit is configured to stop the charging operation when the vehicle information indicates that the vehicle is in a traffic jam.

2. The data and/or command device as claimed in claim 1, wherein the control and/or regulating unit is configured to carry out a readiness check of the electrical unit, as a function of the evaluation.

3. The data and/or command device as claimed in claim 1, wherein the control and/or regulating unit is configured to output at least one motivational alert as a function of the evaluation.

4. The data and/or command device as claimed in claim 1, wherein the control and/or regulating unit is configured to output at least one charging alert as a function of the evaluation.

5. The data and/or command device as claimed in claim 1, wherein the control and/or regulating unit is configured to activate or deactivate the electrical unit for use as a function of the evaluation.

6. The data and/or command device as claimed in claim 1, wherein the control and/or regulating unit is configured to provide at least one use history of at least one of the electrical unit, and the vehicle, as a function of the evaluation.

7. The data and/or command device as claimed in claim 1, wherein the electrical unit is a hand-held power tool.

8. A data and/or command system comprising:
   at least one hand-held power tool;
   a vehicle configured to transport the at least one hand-held power tool, the vehicle including at least one electronics unit configured to provide at least one item of vehicle information of the vehicle; and
   at least one data and/or command device including
      at least one communication unit configured to receive at least one of (i) non-charging-related object information of the at least one power tool, and (ii) the at least one item of vehicle information of the vehicle, and
      at least one control and regulating unit configured to (i) output at least one alert, and (ii) control and/or regulate the at least one hand-held power tool, as a function of an evaluation of at least one of the non-charging-related object information and the at least one item of vehicle information of the vehicle, wherein the control and/or regulating unit is configured to start or to stop a charging operation of the electrical unit based on the evaluation, wherein the control and/or regulating unit is configured to start the charging operation when the vehicle information indicates that the vehicle is driving downhill.

9. The data and/or command device as claimed in claim 1, wherein the control and/or regulating unit is configured to start the charging operation when the vehicle information indicates that the vehicle is driving downhill.

10. The data and/or command device as claimed in claim 1, wherein the control and/or regulating unit is configured to start or to stop the charging operation based on a route profile of the vehicle as included in the vehicle information.

11. The data and/or command device as claimed in claim 8, wherein the control and/or regulating unit is configured to stop the charging operation when the vehicle information indicates that the vehicle is in a traffic jam.

12. The data and/or command system as claimed in claim 8, wherein the vehicle is configured as an autonomous vehicle which is provided for autonomous transport of the at least one hand-held power tool, as a function of the evaluation.

13. The data and/or command system, in particular as claimed in claim 8, further comprising:
   at least one virtual reality unit configured to output an alert in an at least partially virtual environment as a function of the evaluation.

14. A method for operating a data and/or command device, comprising:
   receiving at least one of (i) non-charging-related object information of an electrical unit, and (ii) vehicle information of at least one vehicle in which the electrical unit is arranged using a communication unit;
   outputting at least one alert as a function of an evaluation of at least one of the non-charging-related object information and the vehicle information using a control and regulating unit; and
   controlling and/or regulating the electrical unit as a function of the evaluation including starting or stopping a charging operation of the electrical unit based on the evaluation using the control and regulating unit; and
   starting or stopping the charging operation based on a route profile of the vehicle as included in the vehicle information.

\* \* \* \* \*